(12) United States Patent
Yang et al.

(10) Patent No.: US 11,218,416 B1
(45) Date of Patent: Jan. 4, 2022

(54) SERVICE AWARE ADMISSION CONTROL FOR IOT APPLICATIONS

(71) Applicant: Verizon Patent and Licensing Inc., Basking Ridge, NJ (US)

(72) Inventors: Jin Yang, Orinda, CA (US); Xin Wang, Morris Plains, NJ (US); Jitendra V. Patel, Bridgewater, NJ (US); Ye Huang, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/995,906

(22) Filed: Aug. 18, 2020

(51) Int. Cl.
| | | |
|---|---|---|
| *H04W 76/10* | (2018.01) | |
| *H04B 7/155* | (2006.01) | |
| *H04L 12/863* | (2013.01) | |
| *H04L 12/911* | (2013.01) | |
| *H04W 76/18* | (2018.01) | |
| *H04W 76/27* | (2018.01) | |
| *H04L 12/927* | (2013.01) | |

(52) U.S. Cl.
CPC .......... *H04L 47/624* (2013.01); *H04L 47/805* (2013.01); *H04L 47/822* (2013.01); *H04L 47/824* (2013.01); *H04W 76/18* (2018.02); *H04W 76/27* (2018.02)

(58) Field of Classification Search
CPC ... H04L 47/624; H04L 47/824; H04L 47/805; H04L 47/822; H04B 7/18539; H04B 17/382; H04B 3/544; H04B 7/18558; H04W 76/27; H04W 76/18; H04W 76/10
See application file for complete search history.

(56) References Cited

U.S. PATENT DOCUMENTS

| | | | |
|---|---|---|---|
| 2016/0007389 A1* | 1/2016 | Shalev | H04W 76/10 370/338 |
| 2016/0066333 A1* | 3/2016 | Suzuki | H04W 72/0493 370/329 |
| 2016/0119972 A1* | 4/2016 | Suzuki | H04L 67/12 455/500 |
| 2017/0118791 A1* | 4/2017 | Kotecha | H04W 4/70 |
| 2019/0052579 A1* | 2/2019 | Senarath | H04L 41/5048 |
| 2019/0166518 A1* | 5/2019 | Arora | H04W 28/0268 |
| 2019/0306761 A1* | 10/2019 | Jin | H04W 80/10 |
| 2019/0373520 A1* | 12/2019 | Sillanpaa | H04W 36/14 |
| 2020/0022061 A1* | 1/2020 | Jin | H04W 36/0033 |
| 2020/0107391 A1* | 4/2020 | Du | H04W 24/04 |
| 2021/0153077 A1* | 5/2021 | Samdanis | H04W 24/02 |
| 2021/0167930 A1* | 6/2021 | Jeon | H04L 5/0094 |
| 2021/0274428 A1* | 9/2021 | Futaki | H04W 48/08 |

* cited by examiner

Primary Examiner — Andrew Wendell (57) ABSTRACT

A network device may receive a request to connect to a network from a user equipment device and perform a first admission control procedure to determine whether to temporarily allow the user equipment device to connect to the network. The network device may receive information identifying a slice associated with the user equipment device in response to determining to temporarily allow the user equipment device to connect to the network. The network device may perform a second admission control procedure to determine whether to allow the user equipment device to connect to the network. The second admission control procedure is based on the slice associated with the user equipment device. The network device may allocate network resources to the user equipment device in response to determining to allow the user equipment device to connect to the network.

20 Claims, 5 Drawing Sheets

SERVICE AWARE ADMISSION CONTROL FOR IOT APPLICATIONS

BACKGROUND

Admission control is performed when a device requests to join a network to ensure that network resources are sufficient before the new connection to the network is established. In some situations, it may be important to differentiate between different priorities associated with Internet of Things (IoT) devices when performing admission control. It may be necessary to differentiate types of IoT devices when performing admission control when sharing radio resources.

DETAILED DESCRIPTION OF THE PREFERRED EMBODIMENTS

The following detailed description refers to the accompanying drawings. The same reference numbers in different drawings may identify the same or similar elements. Also, the following detailed description does not limit the invention.

Wireless access networks are traditionally designed to support mobile devices, such as smart phones, however, an increasing number of IoT applications have led to a growing number of IoT devices employing machine-to-machine (M2M) communication, such as Machine-Type Communication (MTC). An IoT device may be configured to communicate with other devices without requiring explicit user interaction. IoT devices may have a wide variety of uses, ranging from stationary uses such as utility meters, environmental sensors, parking meters and/or occupancy sensors, security sensors, smart lighting, traffic cameras, advertising displays, point-of-sale terminals, vending machines, remote diagnostics devices, power grid sensors and/or management devices, to high speed autonomous vehicles and aerial drones.

Uses of IoT devices are envisioned to increase exponentially and may result in a large number of such devices being serviced by a wireless access network. If too many IoT devices are accessing the wireless access network at the same time, the amount of signaling traffic may be as large as or greater than the amount of data traffic. To avoid congestion, some IoT devices may be rejected before connecting to the wireless access network. In implementations described herein, critical IoT devices may be differentiated from enhanced Mobile Broadband (eMBB) devices and massive IoT devices while sharing radio resources.

Using network slicing, a physical network may be sectioned (or "sliced") into multiple, virtual, end-to-end networks. Each network slice may be dedicated for different types of services with different characteristics and requirements (e.g., latency, voice, jitter, bandwidth, pricing, etc.). As used herein, the term "slice" or "network slice" refers to a complete logical network including a Radio Access Network (RAN) and Core Network that provides certain telecommunication services and network capabilities that can vary from slice to slice. Selection of network slices can, thus, have significant impact on network performance and user experience.

In some instances, user devices may be configured to use a particular network slice upon connection to a network (e.g., a Fifth Generation (5G) network). The network slice may be associated with a particular quality of service (QoS) flow. For example, an IoT device may be designated with a particular slice ID that matches network slice characteristics to the type of traffic generated by the IoT device. Additionally, a slice or QoS flow may be identified by other identifiers, such as Public Land Mobile Network Identifier (PLMN ID), Network Slice Selection Assistance Information (NSSAI), a Service Profile Identifier (SPID), Radio Resource Control (RRC) establishment cause, QoS Class Identifier (QCI), Fifth Generation (5G) QoS Identifier (5QI), and/or additional identifiers.

Admission control is a validation process in which an RRC connection check is performed before a connection between a user device and a network is established to see if current resources are sufficient for the connection. Systems and methods described herein may provide service aware admission and congestion control for IoT services. In one implementation, the admission and congestion control may be based on network analytics and historical trends associated with the network. Implementations described herein may place restrictions on the number of user devices and/or RRC connections allowed per slice or QoS flow. In one implementation, the IoT services for different short burst traffic, such as firmware over-the-air (FOTA) updates and critical IoT traffic, may be different per slice or QoS flow. Additionally, the user plane and control plane IoT services may be different per slice or QoS flow.

Systems and methods described herein may reject user devices or deny a user device's request for connection to a network for a period of time with varying extended waiting times for different slices or QoS flows. In one implementation, a critical IoT device (e.g., a security device, a medical device, etc.) may have a higher admission rate and lower waiting time after rejection than a non-critical IoT device. In addition, systems and methods described herein may provide for access barring on a per slice or QoS flow basis. In one implementation, access barring thresholds may be based on load level or excessive connection failures for a slice or QoS flow.

Figure 1:
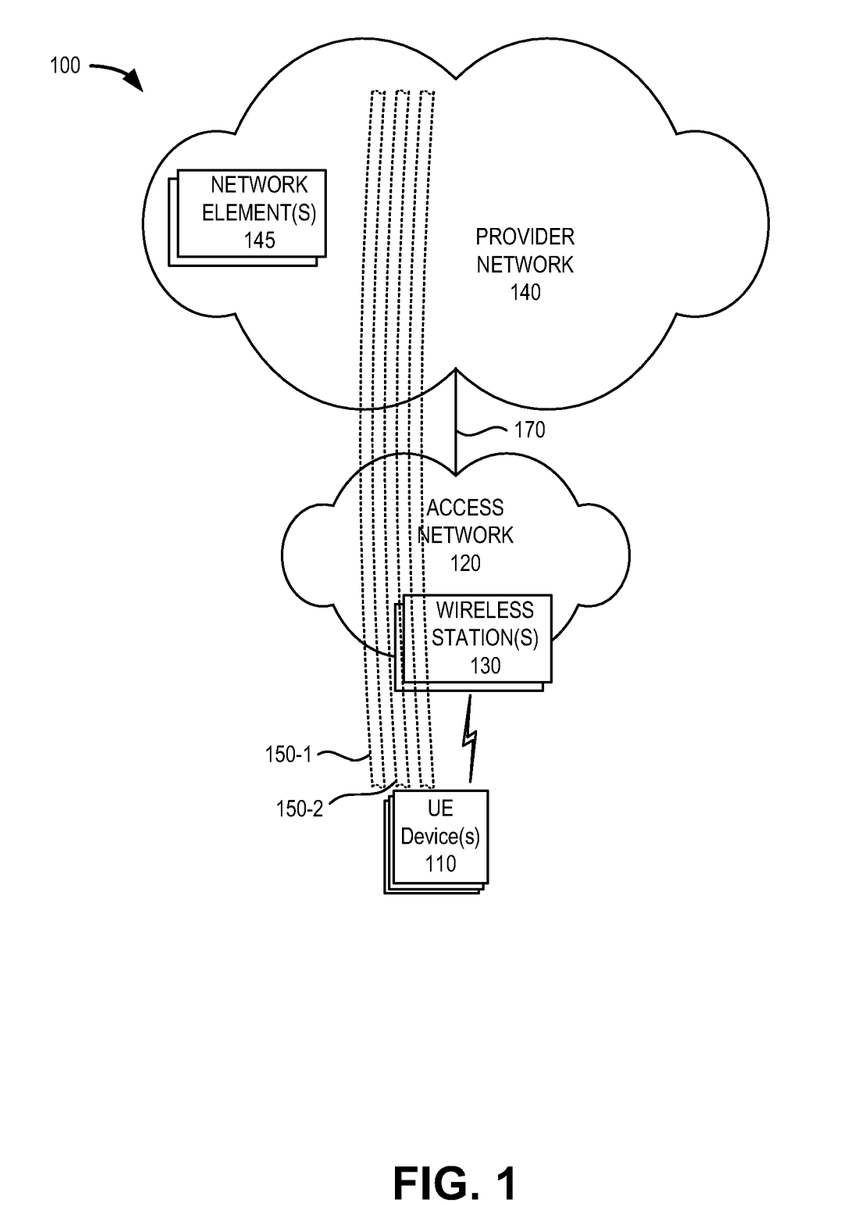
FIG. 1 is a diagram illustrating an environment according to an implementation described herein.

FIG. 1 is a diagram illustrating concepts described herein. As shown in FIG. 1, an environment 100 may include one or more user equipment (UE) devices 110, an access network 120, one or more wireless stations 130, and a provider network 140. Each UE device 110 may connect to access provider network 140 via access network 120 using one of multiple available network slices 150 (e.g., slice 150-1, 150-2, etc.).

UE device 110 may include a wireless MTC device that communicates wirelessly with other devices over a M2M interface; a handheld wireless communication device; a wearable computer device (e.g., a head-mounted display computer device, a head-mounted camera device, a wrist-watch computer device, etc.); a global positioning system (GPS) device; a media playing device; a portable gaming system; a laptop, tablet, or another type of portable computer; a smartphone; and/or any other type of computer device with wireless communication capabilities. UE device 110 may be used for voice communication, mobile broadband services (e.g., video streaming, real-time gaming, premium Internet access etc.), best-effort data traffic, and/or other types of applications.

According to exemplary implementations described herein, UE device 110 may be configured to use one or more applications or services that are optimally supported by a specific type of network slice 150. For example, UE device 110 may be provisioned with a network slice selection identifier (NSSID) that can be provided by the UE during an initial registration procedure. The NSSID may indicate, for example, a particular network slice that is optimally configured for a type of traffic initiated/required by UE device 110, traffic such as massive IoT data, video streaming, designated emergency data, etc.

Access network 120 may provide access to provider network 140 for wireless devices, such as UE device 110. Access network 120 may enable UE device 110 to connect to provider network 140 for Internet access, non-Internet Protocol (IP) data delivery, cloud computing, mobile telephone service, Short Message Service (SMS) message service, Multimedia Message Service (MMS) message service, and/or other types of data services. Access network 120 may include wireless stations 130, and UE devices 110 may wirelessly communicate with access network 120 via wireless station 130. Access network 120 may establish a packet data network connection between UE device 110 and provider network 140 via one or more Access Point Names (APNs). For example, wireless access network 120 may establish an Internet Protocol (IP) connection between UE device 110 and provider network 140. In another implementation, access network may provide access to a service or application layer network, a cloud network, a multi-access edge computing (MEC) network, a fog network, and so forth. Furthermore, access network 120 may enable a server device to exchange data with UE device 110 using a non-IP data delivery method such as Data over Non-Access Stratum (DoNAS).

Access network 120 may include a 5G access network or another advanced network that supports network slicing. Additionally access network may include functionality such as a mm-wave Radio Access Network (RAN); advanced or massive multiple-input and multiple-output (MIMO) configurations (e.g., an 8×8 antenna configuration, a 16×16 antenna configuration, a 256×256 antenna configuration, etc.); cooperative MIMO (CO-MIMO); carrier aggregation; relay stations; Heterogeneous Networks (HetNets) of overlapping small cells and macrocells; Self-Organizing Network (SON) functionality; MTC functionality, such as 1.4 MHz wide enhanced MTC (eMTC) channels (also referred to as category Cat-M1), Low Power Wide Area (LPWA) technology such as Narrow Band (NB) IoT (NB-IoT) technology, and/or other types of MTC technology; and/or other types of 5G functionality.

Wireless station 130 may include a gNodeB base station device and/or an eNodeB base station device that includes one or more devices (e.g., wireless transceivers) and other components and functionality that allow UE device 110 to wirelessly connect to access network 120. Wireless station 130 may correspond to a macrocell or to a small cell (e.g., a femtocell, a picocell, a microcell, etc.). In other implementations, wireless station 130 may include another type of base station for another type of wireless network that supports network slicing. Wireless station 130 may include or be associated with one or more network slices 150.

According to implementations described herein, wireless station 130 may apply slice-based admission controls. Wireless stations 130 may connect to provider network 140 via backhaul links 170.

Provider network 140 may include a local area network (LAN), a wide area network (WAN), a metropolitan area network (MAN), an optical network, a cable television network, a satellite network, a wireless network (e.g., a code-division multiple access (CDMA) network, a general packet radio service (GPRS) network, and/or an LTE network), an ad hoc network, a telephone network (e.g., the Public Switched Telephone Network (PSTN) or a cellular network), an intranet, or a combination of networks. In one implementation, provider network 140 may allow the delivery of Internet Protocol (IP) services to UE device 110, and may interface with other external networks, such as private IP networks.

According to one implementation, provider network 140 may include a core network for one or multiple access networks 120. For example, provider network 140 may include the core part of a 5G New Radio network, etc. Depending on the implementation, provider network 140 may include various network elements 145, such as a gateway, a support node, a serving node, a router, a switch, a bridge, as well as other network elements pertaining to various network-related functions, such as billing, security, authentication and authorization, network polices, subscriber profiles, etc. In some implementations, provider network 140 may include an Internet Protocol Multimedia Sub-system (IMS) network (not shown in FIG. 1). An IMS network may include a network for delivering IP multimedia services and may provide media flows between UE device 110 and external IP networks (not shown in FIG. 1).

Network slices 150 may be configured with different characteristics to support different types of applications and/or services, such as video streaming, massive IoT traffic, autonomous driving, etc. According to implementations described herein, UE device 110 may be configured with a default network slice 150 that may be structured for the type of network traffic initiated by UE device 110 (e.g., with particular characteristics for latency, bandwidth, jitter, etc.). According to implementations described further herein, each wireless station 130 may store in memory (e.g., locally or remotely) a table of available network slices supported through the wireless station 130 with current status for each network slice. Wireless station 130 may apply admission controls to incoming service requests to admit, block, delay or redirect the requesting UE device depending on slice congestion levels and other factors.

Although FIG. 1 shows exemplary components of environment 100, in other implementations, environment 100 may include fewer components, different components, differently arranged components, or additional functional components than depicted in FIG. 1. For example, in one implementation, environment 100 may include an MEC network that provides applications and services at the edge of a network, such as provider network 140. Additionally or alternatively, one or more components of environment 100 may perform functions described as being performed by one or more other components of environment 100.

Figure 2:
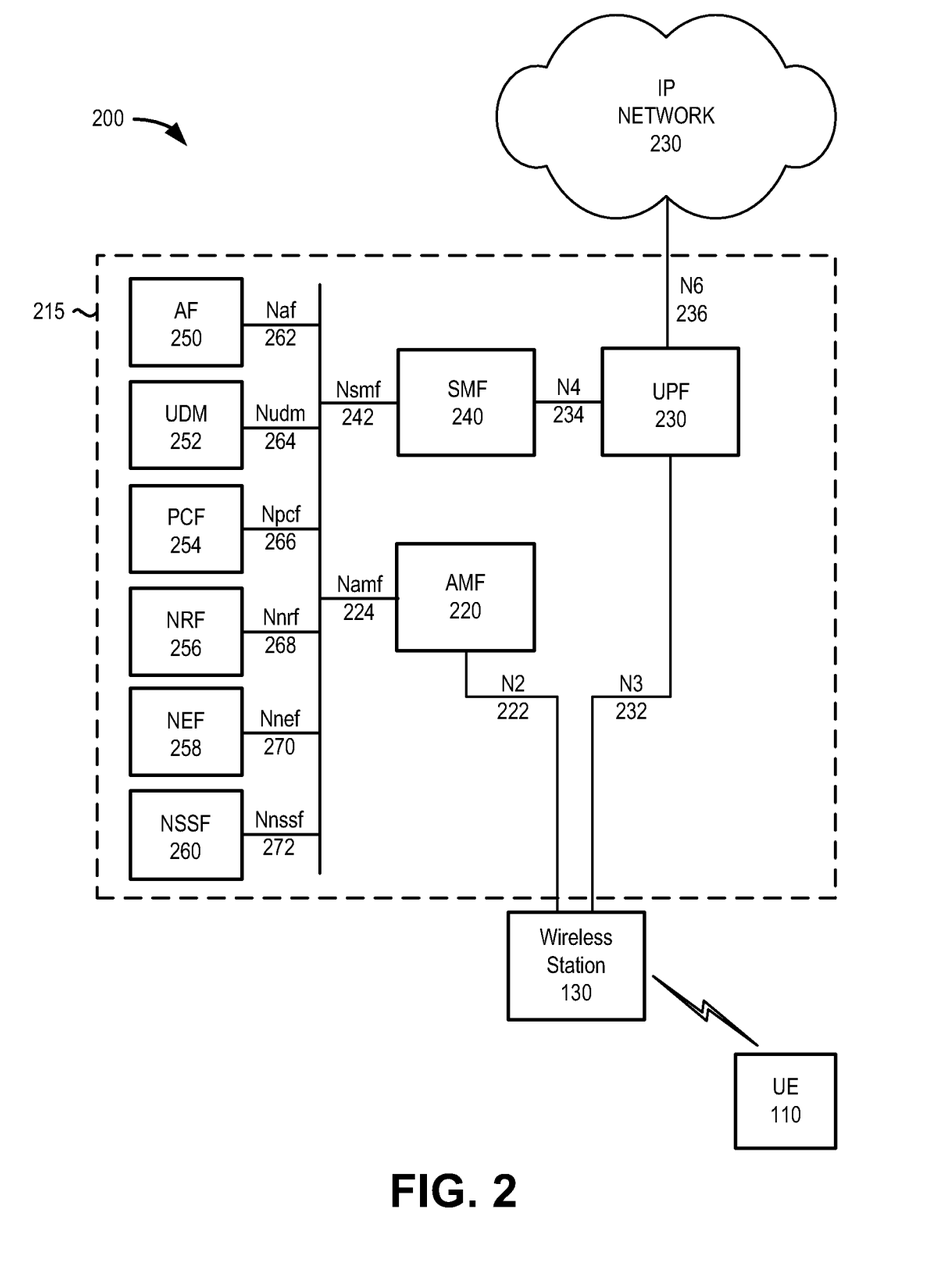
FIG. 2 is a diagram of a network environment illustrating exemplary components of the environment of FIG. 1.

FIG. 2 is a diagram illustrating a network environment 200 that includes exemplary components of environment 100 according to an implementation described herein. As shown in FIG. 2, network environment 200 may include UE device 110, wireless station 130, a core network 215, and an IP network 230. Core network 215 and IP network 230 may correspond to, or be included in, provider network 140.

Core network 215 may include an Access and Mobility Management Function (AMF) 220, a User Plane Function (UPF) 230, a Session Management Function (SMF) 240, an Application Function (AF) 250, a Unified Data Management (UDM) 252, a Policy Control Function (PCF) 254, a Network Repository Function (NRF) 256, a Network Exposure Function (NEF) 258, and a Network Slice Selection Function (NSSF) 260. AMF 220, UPF 230, SMF 240, AF 250, UDM 252, PCF 254, NRF 256, NEF 258, and NSSF 260 may correspond to network elements 145 of FIG. 1 and may each be implemented as separate network devices or as nodes shared among one or more network devices. While FIG. 2 depicts a single AMF 220, UPF 230, SMF 240, AF 250, UDM 252, PCF 254, NRF 256, NEF 258, and NSSF 260 for illustration purposes, in practice, FIG. 2 may include multiple wireless stations 130, AMFs 220, UPFs 230, SMFs 240, AFs 250, UDMs 252, PCFs 254, NRFs 256, NEFs 258, and/or NSSFs 260.

Wireless station 130 may include one or more devices and other components and functionality that enable UE device 110 to wirelessly connect to access network 120 using 5G Radio Access Technology (RAT). Wireless station 130 may include, for example, a gNodeB (gNB) with a wireless transceiver with an antenna array configured for mm-wave wireless communication. In other implementation, wireless station 130 may include another type of base station that supports network slicing. Wireless station 130 may communicate with AMF 220 using an N2 interface 222 and communicate with UPF using an N3 interface 232. According to implementations described herein, wireless station 130 may receive and store network slice data which may be used for applying intelligent admission control during an initial attachment process for UE device 110.

AMF 220 may perform registration management, connection management, reachability management, mobility management, lawful intercepts, Short Message Service (SMS) transport between UE device 110 and an SMS function (not shown in FIG. 2), session management messages transport between UE device 110 and SMF 240, access authentication and authorization, location services management, functionality to support non-3GPP access networks, and/or other types of management processes. AMF 220 may be accessible by other function nodes via a Namf interface 224. In one implementation, AMF 220 may have multiple instances, where each AMF instance is associated with a particular network slice (e.g., network slice 150). According to implementations described herein, an AMF 220 may receive and forward network slice status information to wireless station 130.

UPF 230 may maintain an anchor point for intra/inter-RAT mobility, maintain an external Packet Data Unit (PDU) point of interconnect to a data network (e.g., IP network 230, etc.), perform packet routing and forwarding, perform the user plane part of policy rule enforcement, perform packet inspection, perform lawful intercept, perform traffic usage reporting, perform QoS handling in the user plane, perform uplink traffic verification, perform transport level packet marking, perform downlink packet buffering, send and forward an "end marker" to a Radio Access Network (RAN) node (e.g., wireless station 130), and/or perform other types of user plane processes. UPF 230 may communicate with SMF 240 using an N4 interface 234 and connect to IP network 201 using an N6 interface 236.

SMF 240 may perform session establishment, modification, and/or release, perform IP address allocation and management, perform Dynamic Host Configuration Protocol (DHCP) functions, perform selection and control of UPF 230, configure traffic steering at UPF 230 to guide traffic to the correct destination, terminate interfaces toward PCF 254, perform lawful intercepts, charge data collection, support charging interfaces, control and coordinate charging data collection, termination of session management parts of NAS messages, perform downlink data notification, manage roaming functionality, and/or perform other types of control plane processes for managing user plane data. SMF 240 may be accessible via an Nsmf interface 242.

AF 250 may provide services associated with a particular application, such as, for example, application influence on traffic routing, accessing NEF 258, interacting with a policy framework for policy control, and/or other types of applications. AF 250 may be accessible via an Naf interface 262.

UDM 252 may maintain subscription information for UE devices 110, manage subscriptions, generate authentication credentials, handle user identification, perform access authorization based on subscription data, perform network function registration management, maintain service and/or session continuity by maintaining assignment of SMF 240 for ongoing sessions, support SMS delivery, support lawful intercept functionality, and/or perform other processes associated with managing user data. UDM 252 may be accessible via a Nudm interface 264.

PCF 254 may support policies to control network behavior, provide policy rules to control plane functions (e.g., to SMF 240), access subscription information relevant to policy decisions, perform policy decisions, and/or perform other types of processes associated with policy enforcement. PCF 254 may be accessible via Npcf interface 266.

NRF 256 may support a service discovery function and maintain a profile of available network function (NF) instances and their supported services. An NF profile may include an NF instance identifier (ID), an NF type, a Public Land Mobile Network identifier (PLMN-ID) associated with the NF, a network slice ID associated with the NF, capacity information for the NF, service authorization information for the NF, supported services associated with the NF, endpoint information for each supported service associated with the NF, and/or other types of NF information. NRF 256 may be accessible via an Nnrf interface 268.

NEF 258 may expose capabilities and events to other NFs, including third-party NFs, AFs, edge computing NFs, and/or other types of NFs. Furthermore, NEF 258 may secure provisioning of information from external applications to access network 120, translate information between access network 120 and devices/networks external to access network 120, support a Packet Flow Description (PFD) function, and/or perform other types of network exposure functions. NEF 258 may be accessible via Nnef interface 270.

NSSF 260 may select a set of network slice instances to serve a particular UE device 110, determine network slice selection assistance information (NSSAI), determine a particular AMF 220 to serve a particular UE device 110, and/or perform other types of processes associated with network slice selection or management. NSSF 260 may be accessible via Nnssf interface 272. According to an implementation described herein, NSFF 260 may store network slice characteristics, which may be provided (e.g., via AMFs 220) to wireless stations 130 for use in selecting an alternate network slice 150 during an initial attachment process for UE device 110.

Although FIG. 2 shows exemplary components of core network 215, in other implementations, core network 215 may include fewer components, different components, differently arranged components, or additional components than depicted in FIG. 2. Additionally or alternatively, one or more components of core network 215 may perform functions described as being performed by one or more other components of core network 215. For example, core network 215 may include additional function nodes not shown in FIG. 2, such as an Authentication Server Function (AUSF), a Non-3GPP Interworking Function (N3IWF), a Unified Data Repository (UDR), an Unstructured Data Storage Network Function (UDSF), a 5G Equipment Identity Register (5G-EIR) function, a Location Management Function (LMF), a Security Edge Protection Proxy (SEPP) function, and/or other types of functions. Furthermore, while particular interfaces have been described with respect to particular function nodes in FIG. 2, additionally or alternatively, core network 215 may include a reference point architecture that includes point-to-point interfaces between particular function nodes.

Figure 3:
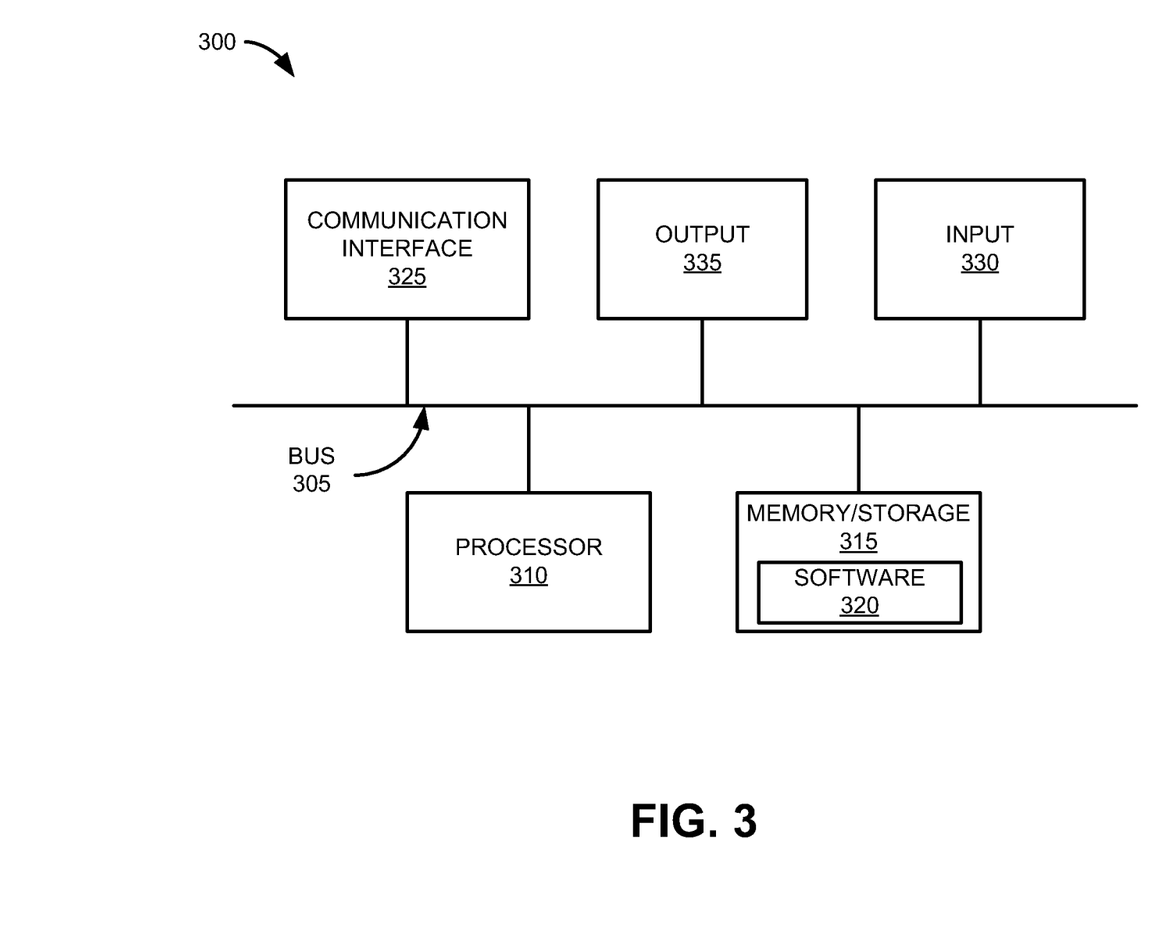
FIG. 3 is a diagram illustrating exemplary components of a device that may correspond to one or more of the devices illustrated and described herein.

FIG. 3 is a diagram illustrating example components of a device 300 according to an implementation described herein. UE device 110, wireless station 130, AMF 220, UPF 230, SMF 240, AF 250, UDM 252, PCF 254, NRF 256, NEF 258, NSSF 260, and/or other components of access network 120 may each include one or more devices 300. In another implementation, a device 300 may include multiple network functions. As illustrated in FIG. 3, according to an exemplary embodiment, device 300 includes a bus 305, a processor 310, a memory/storage 315 that stores software 320, a communication interface 325, an input 330, and an output 335. According to other embodiments, device 300 may include fewer components, additional components, different components, and/or a different arrangement of components than those illustrated in FIG. 3 and described herein.

Bus 305 includes a path that permits communication among the components of device 300. For example, bus 305 may include a system bus, an address bus, a data bus, and/or a control bus. Bus 305 may also include bus drivers, bus arbiters, bus interfaces, and/or clocks.

Processor 310 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 310 may be implemented as hardware (e.g., a microprocessor, etc.), a combination of hardware and software (e.g., a SoC, an ASIC, etc.), may include one or multiple memories (e.g., cache, etc.), etc. Processor 310 may be a dedicated component or a non-dedicated component (e.g., a shared resource).

Processor 310 may control the overall operation or a portion of operation(s) performed by device 300. Processor 310 may perform one or multiple operations based on an operating system and/or various applications or computer programs (e.g., software 320). Processor 310 may access instructions from memory/storage 315, from other components of device 300, and/or from a source external to device 300 (e.g., a network, another device, etc.). Processor 310 may perform an operation and/or a process based on various techniques including, for example, multithreading, parallel processing, pipelining, interleaving, etc.

Memory/storage 315 includes one or multiple memories and/or one or multiple other types of storage mediums. For example, memory/storage 315 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory (e.g., a NAND flash, a NOR flash, etc.), and/or some other type of memory. Memory/storage 315 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 315 may include a drive for reading from and writing to the storage medium.

Memory/storage 315 may be external to and/or removable from device 300, such as, for example, a Universal Serial Bus (USB) memory stick, a dongle, a hard disk, mass storage, off-line storage, network attached storage (NAS), or some other type of storing medium (e.g., a compact disk (CD), a digital versatile disk (DVD), a Blu-Ray disk (BD), etc.). Memory/storage 315 may store data, software, and/or instructions related to the operation of device 300.

Software 320 includes an application or a program that provides a function and/or a process. Software 320 may include an operating system. Software 320 is also intended to include firmware, middleware, microcode, hardware description language (HDL), and/or other forms of instruction. Additionally, for example, UE device 110 and/or wireless station 130 may include logic to perform tasks, as described herein, based on software 320.

Communication interface 325 permits device 300 to communicate with other devices, networks, systems, devices, and/or the like. Communication interface 325 includes one or multiple radio frequency (RF) wireless interfaces and/or wired interfaces. For example, communication interface 325 may include one or multiple transmitters and receivers, or transceivers. Communication interface 325 may include one or more antennas. For example, communication interface 325 may include an array of antennas. Communication interface 325 may operate according to a protocol stack and a communication standard. Communication interface 325 may include various processing logic or circuitry (e.g., multiplexing/de-multiplexing, filtering, amplifying, converting, error correction, etc.).

Input 330 permits an input into device 300. For example, input 330 may include a keyboard, a mouse, a display, a button, a switch, an input port, speech recognition logic, a biometric mechanism, a microphone, a visual and/or audio capturing device (e.g., a camera, etc.), and/or some other type of visual, auditory, tactile, etc., input component. Output 335 permits an output from device 300. For example, output 335 may include a speaker, a display, a light, an output port, and/or some other type of visual, auditory, tactile, etc., output component. According to some embodiments, input 330 and/or output 335 may be a device that is attachable to and removable from device 300.

Device 300 may perform a process and/or a function, as described herein, in response to processor 310 executing software 320 stored by memory/storage 315. By way of example, instructions may be read into memory/storage 315 from another memory/storage 315 (not shown) or read from another device (not shown) via communication interface 325. The instructions stored by memory/storage 315 cause processor 310 to perform a process described herein. Alternatively, for example, according to other implementations, device 300 performs a process described herein based on the execution of hardware (processor 310, etc.).

Figure 4:
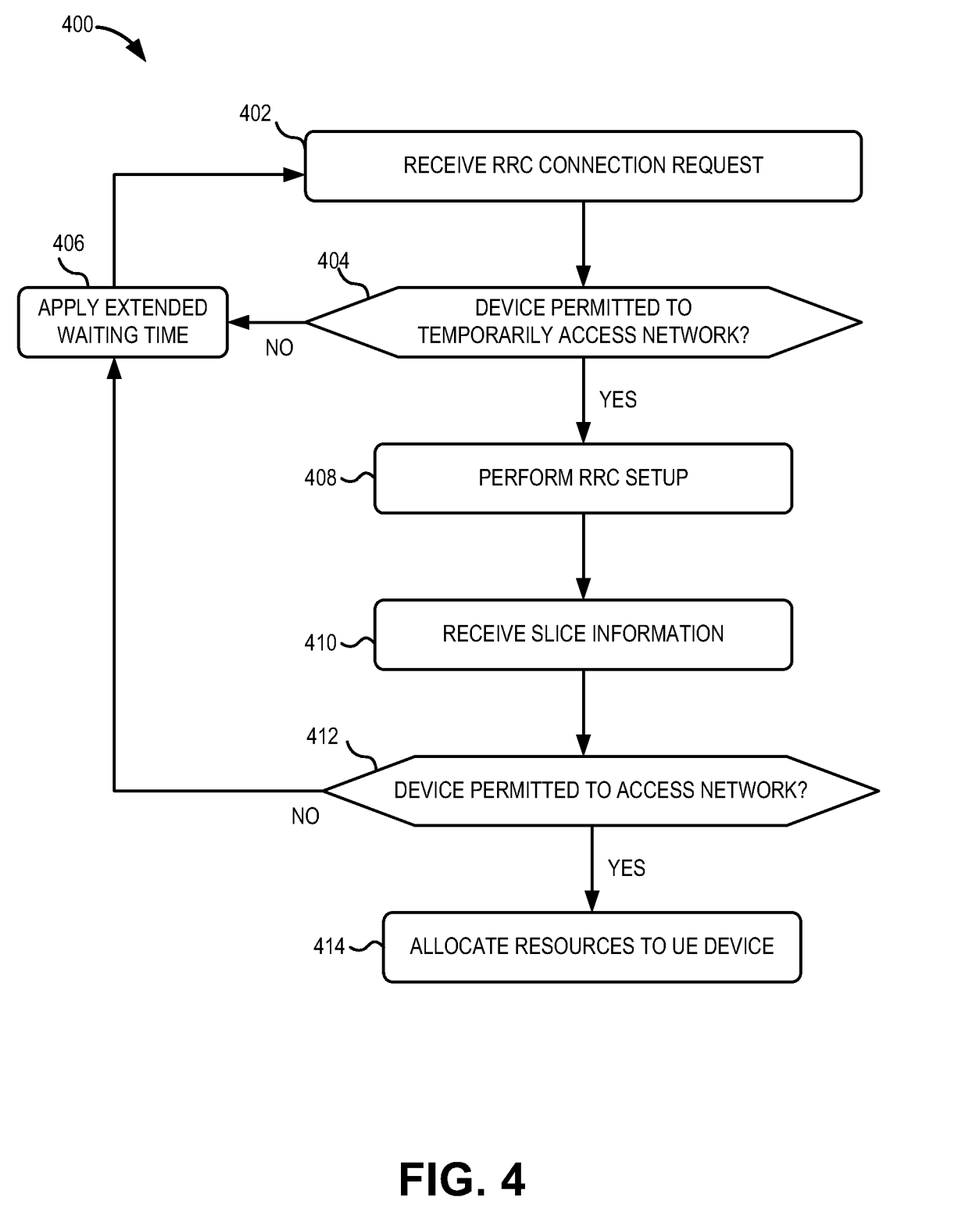
FIG. 4 is a flow diagram illustrating an exemplary process for applying admission control at a wireless station, according to implementations described herein.

FIG. 4 is a flow diagram illustrating an exemplary process 400 for performing service aware admission control, according to an implementation described herein. In one implementation, process 400 may be implemented by wireless station 130. In another implementation, process 400 may be implemented by wireless station 130 in conjunction with one or more other devices in network environment 200.

Referring to FIG. 4, process 400 may begin by receiving an RRC connection request (block 402). For example, wireless station 130 may receive an RRC connection request from UE device 110 indicating that UE device 110 is attempting to connect to a wireless network, such as access network 120. In one implementation, the RRC connection request may include a PLMN ID or other identifier associated with UE device 110, RRC establishment cause information, RAT information, and/or additional information.

An initial admission control may be performed based on receiving the RRC connection request to determine whether UE device 110 will be initially admitted to the network (block 404). For example, wireless station 130 may perform an initial admission control procedure based on information in the RRC establishment cause to determine whether UE device 110 will be initially accepted to (e.g., permitted to temporarily access) the network. An RRC connection request may be treated differently depending on the establishment cause associated with the RRC connection request. The establishment cause may provide a general indication of the nature of the RRC connection request. In one implementation, an admission rate may be higher for a critical IoT device (e.g., an IoT device associated with an emergency service) than for a non-critical IoT device (e.g., a utility meter).

In one implementation, the initial admission control processing may be based on a RAN load and SON inputs. A SON may include an automated system that configures, manages, optimizes, and heals or modifies mobile RANs quickly and dynamically. The initial admission control may further be based on a current number of RRC connections at a cell site and a number of devices that may be accepted to the cell site. The initial admission control may further be based on a dynamic load at a RAN site and a projected load at the RAN site based on historic load data (based on, for example, the SON inputs).

If wireless station 130 determines that UE device 110 is not to be admitted to the network (block 404—no), UE device 110 may be rejected and an extended waiting time for attempting to admit UE device 110 may be applied (block 406). For example, if the network is congested or if the projected load/congestion on the network is too high, the RRC connection request may be denied and the extended waiting time may be applied. The extended waiting time may be a random time and a different extended waiting time may be applied to different UE devices 110. For example, a wait time for a critical IoT device may be shorter than the wait time for a non-critical IoT device. After the extended waiting time has elapsed, UE device 110 may send an additional RRC connection request to wireless station 130 (block 402).

If UE device 110 passes the initial admission control (block 404—yes), an RRC connection setup may be performed (block 408). When the RRC setup is complete, wireless station 130 may receive slice information indicating a slice 150 associated with UE device 110 (block 410). For example, UE device 110 may send wireless station 130 an indication that the RRC setup is complete and may further transmit a message to wireless station 130 indicating the slice 150 or QoS flow associated with UE device 110.

Wireless station 130 may receive the network slice information and determine whether to admit UE device 110 to the network based on the slice information (block 412). In one implementation, wireless station 130 may perform a second admission control procedure based on the slice 150 or QoS flow. For example, the slice 150 or QoS flow associated with UE device 110 may be identified by receiving the NSSAI, PLMN ID, SPID, RRC establishment cause, QCI, 5QI, a UE subscriber identifier, and/or additional parameters associated with UE device 110. In one implementation, the second admission control procedure may be performed based on a combination of the slice 150 or QoS flow associated with UE device 110 and an identifier associated with UE device 110.

In one implementation, a determination of whether to admit UE device 110 to the network may be based on the number of UE devices 110 connected to the network, a number of RRC connections, and/or data radio bearers (DRBs) per slice 150 or QoS flow. The number of RRC connections or DRBs may be restricted and may differ per slice 150 or QoS flow. For example, the maximum number of UE devices 110 or RRC connections may be different for short burst traffic, massive IoT traffic, critical IoT traffic, or other traffic. In addition, a determination of whether to admit UE device 110 to the network may be based on a service type associated with UE device 110. For example, a critical IoT device requesting critical services (e.g., emergency services) may have a higher admission rate than a non-critical IoT device.

In one implementation, when performing the second admission control, wireless station 130 may check the resources assigned to the slice 150 or QoS flow associated with UE device 110 and a number of UE devices in the network. A number of connected UE devices 110 or a number of RRC connections may be restricted based on a maximum number of UE devices 110 or RRC connections in the slice 150 or QoS flow as well as the maximum number of UE devices 110 or RRC connections in the network. A determination of whether to admit UE device 110 to the network may be based on a combination of resources available to slice 150 and resources available to the network.

In another implementation, a determination whether to admit UE device 110 to the network may be made based on a data demand from UE device 110 and a load factor associated with the network. For example, a Network Data Analytics Function (NWDAF) may perform an end-to-end latency analysis on the network and may determine whether to admit UE device 110 to the network based on the latency and the services required by UE device 110. Different services may have different latency requirements. For example, if the network is experiencing high latency and UE device 110 is requesting services with low latency requirements, UE device 110 may not be accepted to the network. However, if the network is experiencing a low latency, UE device 110 may be admitted to the network. In another example, if the NWDAF analysis indicates that the network is experiencing high delays, a critical IoT device may be admitted to the network and a non-critical IoT device may not be admitted to the network.

In another implementation, a determination whether to admit UE device 110 to the network may be based on access barring and access barring thresholds. Access barring thresholds may be based on network load levels and excessive network failures. Network load levels may be based on noise floor on the uplink, radio resource utilization on the user plane, Physical Resource Block (PRB) utilization, control plane Physical Downlink Control Channel (PDCCH) utilization, and/or additional factors. Excessive network failures may include repeated access requests, Random Access Channel (RACH) failures, excessive repetitions, and/or additional failures.

The load threshold for barring may be different for different access technologies and services. For example, the load threshold for barring may be different for critical IoT versus massive IoT. Additionally, a random barring probability for UE device 110 may be based on slice 150 or QoS flow associated with UE device 110. For example, a random barring probability may be 0 for critical IoT, 1 for massive IoT, and 0.5 for eMBB.

Referring back to FIG. 4, if wireless station 130 determines that UE device 110 is not to be admitted to the network (block 412—no), UE device 110 may be rejected and an extended waiting time for attempting to admit UE device 110 may be applied to UE device 110 (block 406). A range of the extended waiting time may be defined based on slice 150 or QoS flow associated with UE device 110. In one implementation, the extended waiting time may be defined as:

$$\text{Extended Waiting Time} = \text{Minimal\_sl} + \text{Range\_sl} \times \text{Random Generator}[0,1] < \text{Maximum\_sl},$$

where Minimal_sl is the minimum waiting extended waiting time for slice 150 or QoS flow, Range_sl is a range of extended waiting times for slice 150 or QoS flow, Random Generator is a random number between 0 and 1, and Maximum_sl is a maximum waiting time for slice 150 or QoS flow.

In one implementation, the wait time for a critical IoT device may be shorter than a wait time for a non-critical IoT device. For example, a critical IoT device may wait the minimum amount of time (which, in one implementation, may be no time) before attempting to connect to the network again. A non-critical IoT device, such as a utility meter, may wait up to the maximum waiting time associated with slice 150 or QoS flow before being permitted to attempt to connect to the network. The random number generator may be implemented to ensure that large numbers of IoT devices are not reattempting to connect to the network at the same time. By randomly assigning wait times to UE devices 110 (i.e., non-critical IoT devices), any reattempts to connect to the network may be spread out over a larger period of time. After the extended waiting time has elapsed, UE device 110 may send an additional RRC connection request to wireless station 130 (block 402).

If wireless station 130 determines that UE device 110 may connect to the network (block 412—yes), UE device 110 may connect to the network and resources may be allocated to UE device 110 (block 414).

Figure 5:
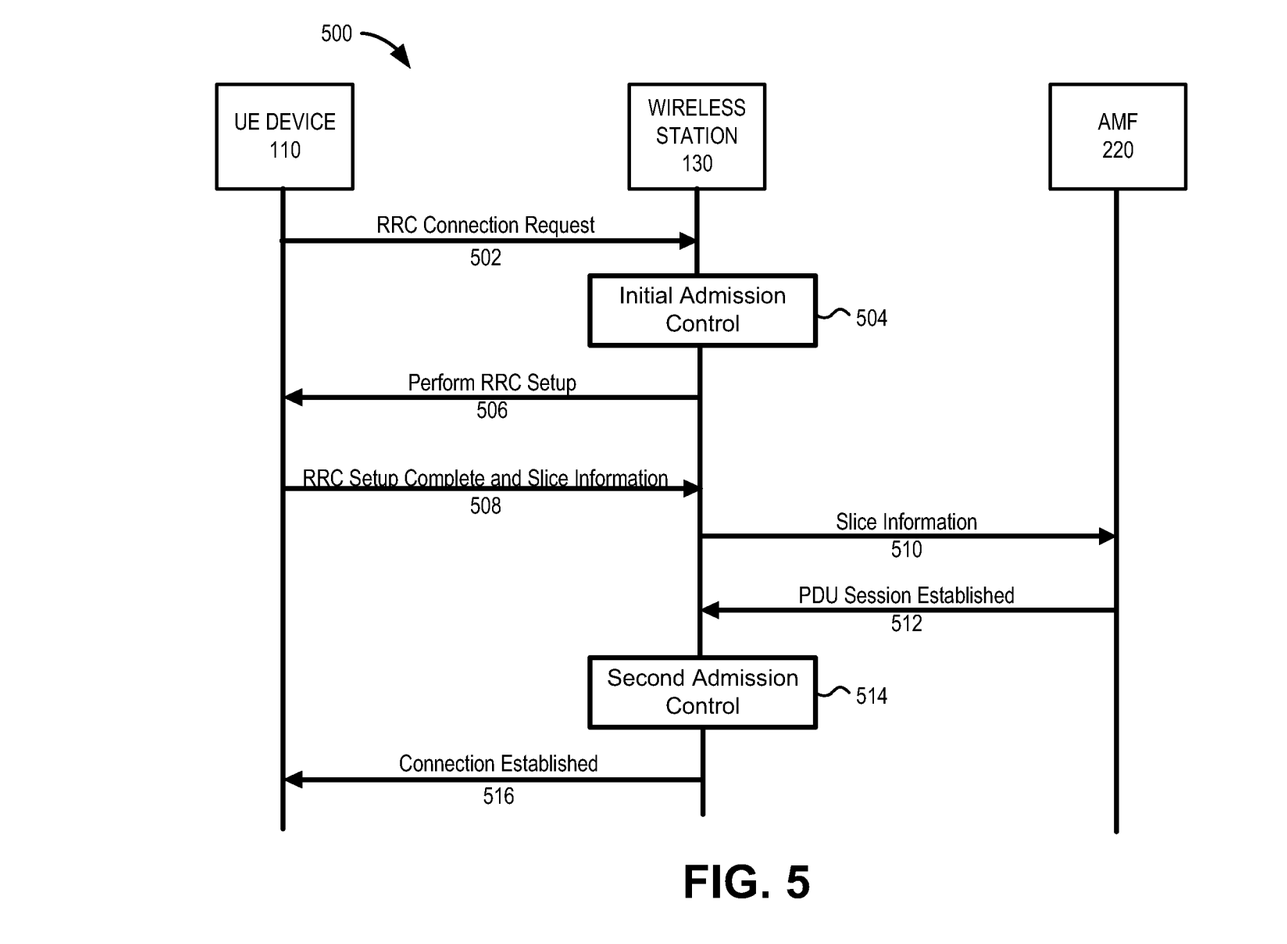
FIG. 5 is a signal flow diagram illustrating exemplary communications among devices in a portion of the network environment of FIG. 2.

FIG. 5 is a diagram illustrating exemplary communications for an admission control process by wireless station 130 based on a slice 150 associated with UE device 110. Network portion 500 may include UE device 110, wireless station 130, and AMF 220. Communications shown in FIG. 5 provide simplified illustrations of communications in network portion 500 and are not intended to reflect every signal or communication exchanged between devices.

Referring to FIG. 5, UE device 110 may send an RRC connection request to wireless station 130 requesting access to a wireless network (502). Wireless network 130 may perform an initial admission control on UE device 110 (504). For example, wireless station 130 may determine whether to temporarily admit UE device 110 to the wireless network based on a plurality of factors, such as network load, a priority associated with UE device 110, services required by UE device 110, and/or additional factors.

If UE device 110 is initially/temporarily admitted to the wireless network, wireless station 130 may send UE device 110 a message indicating that UE device 110 has been temporarily accepted into the network and RRC setup is to be performed (506). UE device 110 may perform the RRC setup and transmit a message to wireless station 130 indicating that RRC setup is complete (508). The message may further indicate the slice 150 associated with UE device 110. For example, UE device 110 may transmit wireless station 130 a non-access stratum (NAS) message indicating that the RRC setup is complete and a NSSAI associated with UE device 110.

Wireless station 130 may forward the slice information to AMF 220 (510) and AMF 220 may establish a PDU session based on the received network slice information. AMF 220 may send wireless station 130 a message indicating that the PDU session has been established (512). For example, AMF 220 may send a NGAP message to wireless station 130 indicating that the initial context setup and bearer activation has been completed.

Wireless station 130 may perform a second admission control using the network slice information associated with UE device 110 (514). In one implementation, as discussed above with respect to FIG. 4, wireless station 130 may determine whether to admit UE device 110 to the network based on a slice quota for RRC connected users. For example, UE device 110 may be admitted to the network if a number of UE devices 110 associated with slice 150 is not at a maximum level for slice 150. Different slices 150 or QoS flows may have different quotas for RRC connected users. In another implementation, wireless station 130 may determine whether to admit UE device 110 to the wireless network based on resources required by UE device 110, resources assigned to slice 150, and/or a number of RRC connections in the network. In another implementation, a determination may be made whether to accept UE device 110 to the network based on an end-to-end latency associated with the network and services required by UE device 110. In another implementation, a determination may be made to admit UE device 110 based on a service required by UE device 110 and a priority associated with UE device 110. For example, a critical IoT device may be admitted before a massive IoT device. In another implementation, a determination may be made to admit UE device 110 to the network based on an access barring threshold and/or random barring probability associated with UE device 110 or slice 150.

When UE device 110 is admitted to the network, wireless network 130 may transmit a message to UE device 110 indicating that UE device 110 has established a connection with the network (516). In one implementation, the message may include an indication that RRC connection reconfiguration may be performed to setup the bearer. In addition, resources may be allocated to UE device 110 for the services requested by UE device 110.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of blocks have been described with regard to the processes illustrated in FIG. 4 and signal flows with respect to FIG. 5, the order of the blocks and signal flows may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 310, etc.), or a combination of hardware and software (e.g., software 320).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 310) of a device. A non-transitory storage medium includes one or more of the storage mediums described in relation to memory/storage 315.

To the extent the aforementioned embodiments collect, store or employ personal information of individuals, it should be understood that such information shall be collected, stored and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known to those of ordinary skill in the art are expressly incorporated herein by reference and are intended to be encompassed by the claims. No claim element of a claim is to be interpreted under 35 U.S.C. § 112(f) unless the claim element expressly includes the phrase "means for" or "step for."

What is claimed is:

1. A method comprising:
   receiving, from a user equipment device and by a network device, a request to connect to a network;
   performing, by the network device, a first admission control procedure to determine whether to temporarily allow the user equipment device to connect to the network;
   receiving, by the network device, information identifying a slice associated with the user equipment device in response to determining to temporarily allow the user equipment device to connect to the network;
   performing, by the network device, a second admission control procedure to determine whether to allow the user equipment device to connect to the network, wherein the second admission control procedure is based on the slice associated with the user equipment device; and
   allocating, by the network device, network resources to the user equipment device in response to determining to allow the user equipment device to connect to the network.

2. The method of claim 1, wherein performing the second admission control procedure includes performing the second admission control procedure based on a current number of radio resource control (RRC) connections associated with the slice and a maximum number of RRC connections allowed for the slice.

3. The method of claim 1, wherein performing the second admission control procedure includes performing the second admission control procedure based on an access barring threshold, and wherein the access barring threshold is based on the slice.

4. The method of claim 1, wherein performing the second admission control procedure includes performing the second admission control procedure based on an end-to-end latency associated with the network.

5. The method of claim 1, wherein performing the first admission control procedure includes performing the first admission control procedure based on a number of user devices connected to the network and a projected congestion level associated with the network.

6. The method of claim 1, further comprising:
   applying a waiting time for reattempting to connect to the network in response to determining not to allow the user equipment device to connect to the network based on performing the second admission control procedure, wherein a length of the waiting time is based on the slice.

7. The method of claim 1, wherein the information identifying a slice includes network slice selection assistance information (NSSAI).

8. A network device comprising:
one or more processors configured to:
receive, from a user equipment device, a request to connect to a network;
perform a first admission control procedure to determine whether to temporarily allow the user equipment device to connect to the network;
receive information identifying a slice associated with the user equipment device in response to determining to temporarily allow the user equipment device to connect to the network;
perform a second admission control procedure to determine whether to allow the user equipment device to connect to the network, wherein the second admission control procedure is based on the slice associated with the user equipment device; and
allocate network resources to the user equipment device in response to determining to allow the user equipment device to connect to the network.

9. The network device of claim 8, wherein, when performing the second admission control procedure, the one or more processors are further configured to:
perform the second admission control procedure based on a current number of radio resource control (RRC) connections associated with the slice and a maximum number of RRC connections allowed for the slice.

10. The network device of claim 8, wherein, when performing the second admission control procedure, the one or more processors are further configured to:
perform the second admission control procedure based on an access barring threshold, and wherein the access barring threshold is based on the slice.

11. The network device of claim 8, wherein, when performing the second admission control procedure, the one or more processors are further configured to:
perform the second admission control procedure based on an end-to-end latency associated with the network.

12. The network device of claim 8, wherein, when performing the first admission control procedure, the one or more processors are further configured to:
perform the first admission control procedure based on a number of user devices connected to the network and a projected congestion level associated with the network.

13. The network device of claim 8, wherein the one or more processors are further configured to:
apply a waiting time for reattempting to connect to the network in response to determining not to allow the user equipment device to connect to the network based on the second admission control procedure, wherein a length of the waiting time is based on the slice.

14. The network device of claim 8, wherein the information identifying a slice includes network slice selection assistance information (NSSAI).

15. A non-transitory, computer-readable storage media storing instructions executable by one or more processors of one or more devices, which when executed cause the one or more devices to:
receive, from a user equipment device, a request to connect to a network;
perform a first admission control procedure to determine whether to temporarily allow the user equipment device to connect to the network;
receive information identifying a slice associated with the user equipment device in response to determining to temporarily allow the user equipment device to connect to the network;
perform a second admission control procedure to determine whether to allow the user equipment device to connect to the network, wherein the second admission control procedure is based on the slice associated with the user equipment device; and
allocate network resources to the user equipment device in response to determining to allow the user equipment device to connect to the network.

16. The non-transitory, computer-readable storage media of claim 15, wherein the instructions to perform the second admission control procedure further comprise instructions to:
perform the second admission control procedure based on a current number of radio resource control (RRC) connections associated with the slice and a maximum number of RRC connections allowed for the slice.

17. The non-transitory, computer-readable storage media of claim 15, wherein the instructions to perform the second admission control procedure further comprise instructions to:
perform the second admission control procedure based on an access barring threshold, and wherein the access barring threshold is based on the slice.

18. The non-transitory, computer-readable storage media of claim 15, wherein the instructions to perform the second admission control procedure further comprise instructions to:
perform the second admission control procedure based on an end-to-end latency associated with the network.

19. The non-transitory, computer-readable storage media of claim 15, wherein the instructions to perform the first admission control procedure further comprise instructions to:
perform the first admission control procedure based on a number of user devices connected to the network and a projected congestion level associated with the network.

20. The non-transitory, computer-readable storage media of claim 15, further comprising instructions to:
apply a waiting time for reattempting to connect to the network in response to determining not to allow the user equipment device to connect to the network based on the second admission control procedure, wherein a length of the waiting time is based on the slice.

* * * * *